United States Patent
Lu

(10) Patent No.: US 12,250,732 B2
(45) Date of Patent: Mar. 11, 2025

(54) METHODS AND DEVICES FOR TRANSMITTING AND RECEIVING RANDOM ACCESS RESPONSE AND COMMUNICATION SYSTEM

(71) Applicant: FUJITSU LIMITED, Kawasaki (JP)

(72) Inventor: Yang Lu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 239 days.

(21) Appl. No.: 17/484,261

(22) Filed: Sep. 24, 2021

(65) Prior Publication Data

US 2022/0015155 A1 Jan. 13, 2022

Related U.S. Application Data

(63) Continuation of application No. PCT/CN2019/080618, filed on Mar. 29, 2019.

(51) Int. Cl.
*H04W 74/08* (2024.01)
*H04W 24/08* (2009.01)
*H04W 72/1263* (2023.01)
*H04W 74/00* (2009.01)
*H04W 74/0833* (2024.01)

(52) U.S. Cl.
CPC ....... *H04W 74/0841* (2013.01); *H04W 24/08* (2013.01); *H04W 72/1263* (2013.01); *H04W 74/006* (2013.01)

(58) Field of Classification Search
CPC ......... H04W 74/0833; H04W 74/0841; H04W 74/006; H04W 72/1263
See application file for complete search history.

(56) References Cited

U.S. PATENT DOCUMENTS

2018/0220288 A1* 8/2018 Agiwal .................. H04W 4/30
2020/0314917 A1* 10/2020 Jeon .................. H04W 74/0833

FOREIGN PATENT DOCUMENTS

CN 107493608 A 12/2017
CN 109392189 A 2/2019

OTHER PUBLICATIONS

Notice of Reasons for Refusal issued by the Japan Patent Office for corresponding Japanese Patent Application No. 2021-556934, mailed on Oct. 4, 2022, with an English translation.

(Continued)

*Primary Examiner* — Sulaiman Nooristany
(74) *Attorney, Agent, or Firm* — Myers Wolin, LLC

(57) ABSTRACT

Methods and devices for transmitting and receiving a random access response and a communication system. The device for transmitting includes: a first transmitting unit configured to transmit a first message (MsgA) of a two-step random access procedure to a network device; wherein the first message (MsgA) comprises preambles and physical uplink shared channel (PUSCH) data; and a first monitoring unit configured to monitor in a first random access response reception time window, a physical downlink control channel (PDCCH) scheduling a first random access response (MsgB) in a two-step random access procedure transmitted by the network device; wherein the first random access response MsgB at least contains a C-RNTI and contention resolution information allocated for the terminal equipment.

12 Claims, 5 Drawing Sheets

(56) References Cited

OTHER PUBLICATIONS

Panasonic, "Discussion on 2-step RACH procedure", Agenda Item: 11.13, 3GPP TSG-RAN WG2 Meeting #105bis, R2-1903914, Xian, China, Apr. 8-12, 2019.

Samsung, "2 Step RA: MsgB Aspects", Agenda Item: 11.13, 3GPP TSG-RAN2 Meeting #105bis, R2-1903113, Xian, China, Apr. 8-12, 2019.

ZTE Corporation et al., "General consideration on the content of MsgB", Agenda Item: 11.13, 3GPP TSG-WG2 Meeting #105-bis, R2-1903548, Xian, China, Apr. 8-12, 2019.

Media Tek Inc., "On the contents of msgA and msgB in 2-step RACH", Agenda Item: 11.13, 3GPP TSG-RAN WG2 Meeting #105bis, R2-1904428, Xian, China, Apr. 8-12, 2019.

NTT Docomo, Inc., "Discussion on Procedure for Two-step RACH", Agenda Item: 7.2.1.2, 3GPP TSG-RAN WG1 Meeting #96, R1-1902785, Athens, Greece, Feb. 25-Mar. 1, 2019.

Qualcomm Incorporated, "Channel Structure for Two-Step RACH", Agenda Item: 7.2.1.1, 3GPP TSG-RAN WG1 Meeting #96, R1-1902977, Athens, Greece, Feb. 25-Mar. 1, 2019.

International Search Report and Written Opinion of the International Searching Authority issued by the China National Intellectual Property Administration for corresponding International Patent Application No. PCT/CN2019/080618, mailed on Jan. 2, 2020, with an English translation.

ZTE et al., "Considerations on 2-Step RACH Procedures", Agenda Item: 7.2.1.2, 3GPP TSG-RAN WG1 Meeting #96, R1-1901627, Athens, Greece, Feb. 25-Mar. 1, 2019.

Nokia et al., "On 2-step RACH Procedure", Agenda Item: 7.2.1.2, 3GPP TSG-RAN WG1 Meeting #96, R1-1902136, Athens, Greece, Feb. 25-Mar. 1, 2019.

Huawei et al., "Two-step RACH procedure for NR-U", Agenda Item: 11.2.1.1, 3GPP TSG-RAN WG2 Meeting #104, R2-1816617, Spokane, USA, Nov. 12-16, 2018.

ZTE, "Summary of 7.2.1.2 Procedure for Two-step RACH", Agenda Item: 7.2.1.2, 3GPP TSG-RAN WG1 Meeting #96, R1-1903436, Athens, Greece, Feb. 25-Mar. 1, 2019.

First Notification of Office Action and Search Report issued by the China National Intellectual Property Administration for corresponding Chinese Patent Application No. 201980093882.1, dated May 9, 2023, with an English translation.

* cited by examiner

METHODS AND DEVICES FOR TRANSMITTING AND RECEIVING RANDOM ACCESS RESPONSE AND COMMUNICATION SYSTEM

CROSS-REFERENCE TO RELATED APPLICATION

This application is a continuation application of International Application PCT/CN2019/080618 filed on Mar. 29, 2019 and designated the U.S., the entire contents of which are incorporated herein by reference.

TECHNICAL FIELD

This disclosure relates to the field of communication technologies, and in particular to methods and devices for transmitting and receiving a random access response and a communication system.

BACKGROUND

A random access procedure is a very critical step in mobile communication technologies.

(a) in FIG. 1 is a flowchart of an existing four-step contention based random access (CBRA) procedure. As shown in (a) in FIG. 1, in step 101, a terminal equipment selects CBRA preambles, and transmits the preambles via Msg1 in a contention-based random access occasion (RO) pre-configured by the system; in step 102, a network device transmits Msg2 after receiving the preambles. As a result, a random access response (RAR) grants a dedicated uplink PUSCH resource, allocates a temporary CRNTI and indicates uplink advance of the PUSCH to the terminal equipment transmitting the preambles; in step 103, the terminal equipment transmits Msg3 carrying signaling or data on the PUSCH resource; and in step 104, the network device transmits contention resolution signaling Msg4 for Msg3 to the terminal equipment.

(b) in FIG. 1 is a flowchart of an existing two-step contention based random access (CBRA) procedure. As shown in (b) in FIG. 1, in step 105, a terminal equipment transmits MsgA, MsgA containing CBRA preambles and payloads. The terminal equipment transmits the preambles of MsgA a contention RO and transmits signaling or service of MsgA in a contention physical uplink shared channel (PUSCH) resource. And in step 106, the network device transmits MsgB after receiving MsgA, and transmits a random access response and a contention resolution message to the terminal equipment.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that after transmitting the preambles of the two-step random access procedure, the terminal equipment may receive the MsgB or the random access response of the four-step random access procedure transmitted by a base station. As a physical downlink control channel (PDCCH) scheduling MsgB or the random access response in the four-step random access procedure is addressed to a random access radio network temporary identifier (RA-RNTI), but it is possible that identical RA-RNTIs are calculated according to time-frequency resource positions of different physical random access channel (PRACH) ROs, confusion random access responses for different PRACH ROs will be produced.

For example, for a four-step random access procedure, an RA-RNTI may be calculated according to a first PRACH RO, and for a two-step random access procedure, an identical RA-RNTI may also be calculated according to a second PRACH RO. Hence, in monitoring PDCCHs based on this RA-RNTI, it is prone to confusion of the random access response of the four-step random access procedure and the random access response of the two-step random access procedure.

In order to solve the above technical problems, embodiments of this disclosure provide methods and devices for transmitting and receiving a random access response and a communication system. In the method for receiving a random access response of the embodiments of this disclosure, a terminal equipment, in a first random access response reception time window, monitors a physical downlink control channel (PDCCH) scheduling a first random access response (i.e., MsgB) in a two-step random access procedure transmitted by a network device, thereby avoiding confusion of random access responses for different PRACH ROs.

According to a first aspect of the embodiments of this disclosure, there is provided a device for receiving a random access response, applicable to a terminal equipment, the device including: a first transmitting unit configured to transmit a first message (MsgA) of a two-step random access procedure to a network device; wherein the first message (MsgA) includes preambles and physical uplink shared channel (PUSCH) data; and a first monitoring unit configured to monitor in a first random access response reception time window, a physical downlink control channel (PDCCH) scheduling a first random access response in a two-step random access procedure transmitted by the network device; wherein the first random access response at least contains a C-RNTI and contention resolution information allocated for the terminal equipment.

According to a second aspect of the embodiments of this disclosure, there is provided a device for transmitting a random access response, applicable to a network device, the device including:

a second transmitting unit configured to transmit indication information indicating a length of a first random access response reception time window by a network device to a terminal equipment, the first random access response reception time window being used by the terminal equipment in monitoring a physical downlink control channel (PDCCH) scheduling a first random access response in a two-step random access procedure; wherein the first random access response MsgB at least contains a C-RNTI and contention resolution information allocated for the terminal equipment.

According to a third aspect of the embodiments of this disclosure, there is provided a communication system, including a network device and a terminal equipment, the terminal equipment including the device for receiving a random access response as described in the first aspect of the embodiments, and the network device including the device for transmitting a random access response as described in the second aspect of the embodiments.

An advantage of the embodiments of this disclosure exists in that the terminal equipment monitors the physical downlink control channel (PDCCH) of MsgB in a specific time window, hence, confusion of random access responses for different PRACH ROs may be avoided.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Figure 1A:
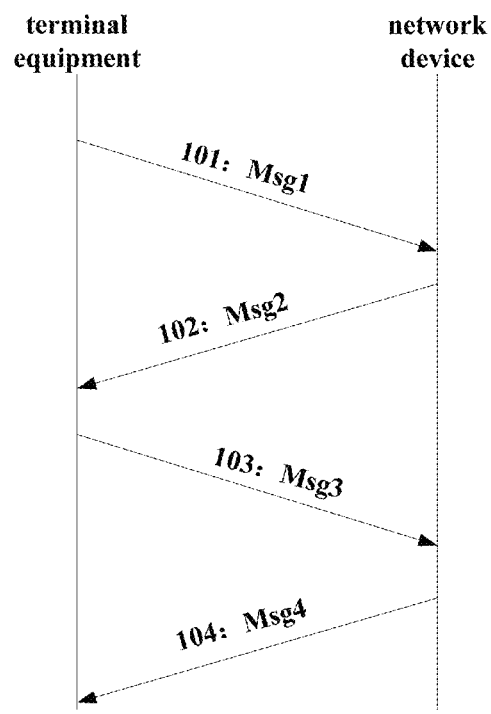
FIG. 1(A) is a flowchart of an existing four-step contention based random access procedure and FIG. 1(B) is a flowchart of an existing two-step contention based random access procedure.
Figure 1B:
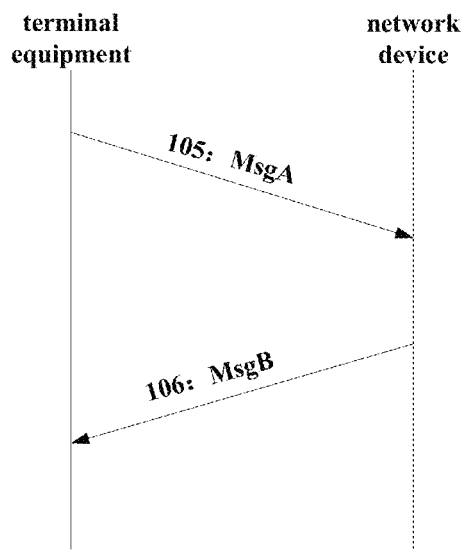

These and further aspects and features of this disclosure will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

Wherein, the base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE)" refers to, for example, equipment accessing to a communication network and receiving network services via a network device, which may also be referred to as. The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

Figure 2:
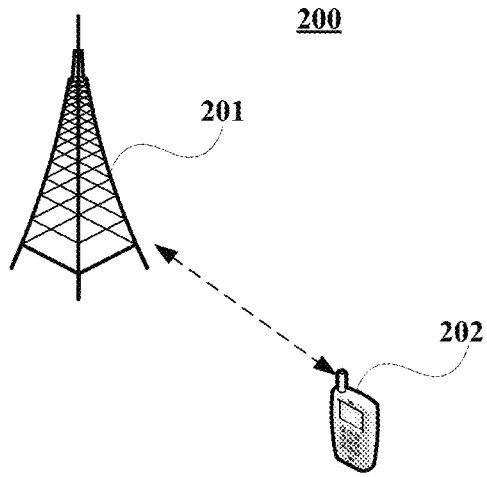
FIG. 2 is a schematic diagram of a communication system of an embodiment of this disclosure.

FIG. 2 is a schematic diagram of a communication system of an embodiment of this disclosure, in which a case where a user equipment and a network device are taken as examples is schematically shown. As shown in FIG. 2, a communication system 200 may include a network device 201 and a terminal equipment 202 (for the sake of simplicity, description is given in FIG. 2 by taking one terminal equipment as an example.

In the embodiment of this disclosure, existing traffics or traffics that may be implemented in the future may be performed between the network device 201 and the terminal equipment 202. For example, such traffics may include but not limited to enhanced mobile broadband (eMBB), massive machine type communication (MTC), and ultra-reliable and low-latency communication (URLLC), etc.

The terminal equipment 202 may transmit data to the network device 201, for example, in a grant or grant-free transmission mode. The network device 201 may receive data transmitted by one or more terminal equipments 202, and feed back information (such as acknowledgement ACK/non-acknowledgement NACK) to the terminal equipment 202, and the terminal equipment 202 may acknowledge terminating a transmission process according to the feedback information, or may further perform new data transmission, or may perform data retransmission.

Furthermore, before the terminal equipment 202 is accessed to the network device 201, the network device 201 may transmit information on system information to the terminal equipment 202, and the terminal equipment 202 detects the received information, so as to achieve downlink synchronization, and establish connection with the network device 201.

Following description shall be given by taking that a network device in a communication system is a transmitter end and a terminal equipment is a receiver end as an example. However, this disclosure is not limited thereto, and the transmitter end and/or the receiver end may also be other devices. For example, this disclosure is applicable to not only signal transmission between a network device and a terminal equipment, but also signal transmission between two terminal equipments.

Embodiment 1

The embodiment of this disclosure provides a method for receiving a random access response, which may be carried out by a terminal equipment.

Figure 3:
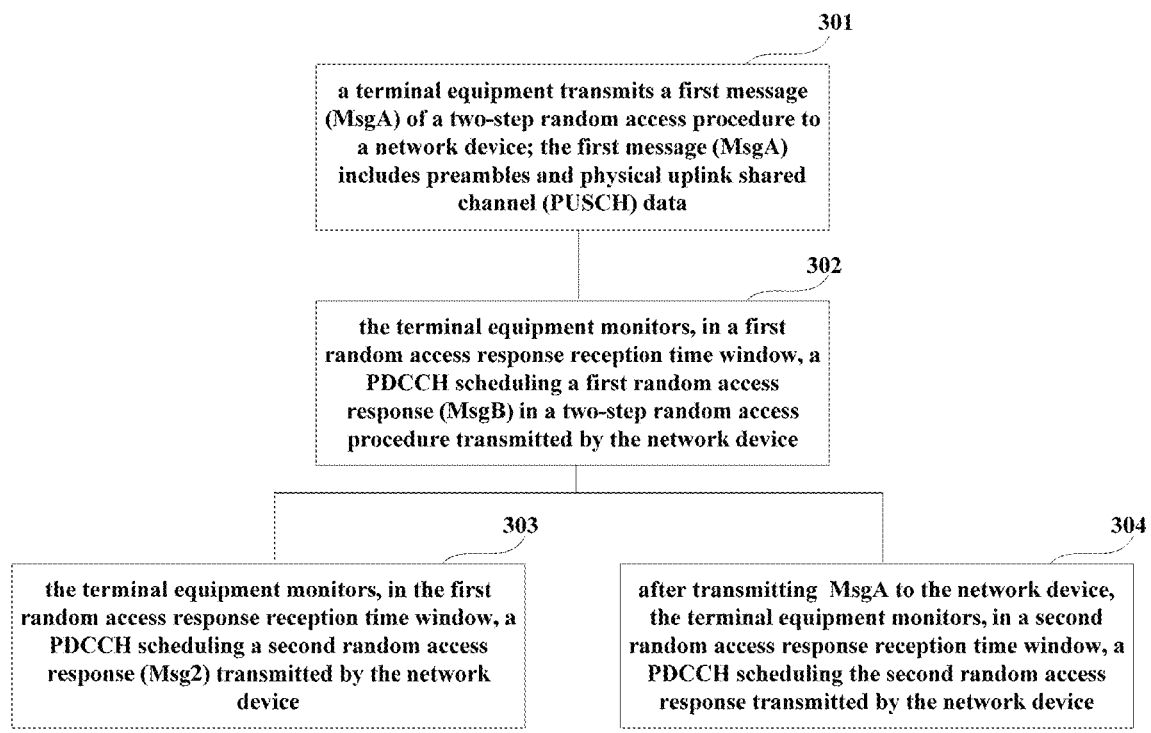
FIG. 3 is a schematic diagram of the method for receiving a random access response of Embodiment 1 of this disclosure.

FIG. 3 is a schematic diagram of the method for receiving a random access response of this embodiment. As shown in FIG. 3, the method includes:

step 301: a terminal equipment transmits a first message (MsgA) of a two-step random access procedure to a network device; the first message (MsgA) includes preambles and physical uplink shared channel (PUSCH) data; and step 302: the terminal equipment monitors, in a first random access response reception time window, a physical downlink control channel (PDCCH) scheduling a first random access response in a two-step random access procedure transmitted by the network device; the first random access response at least contains a C-RNTI and contention resolution information allocated for the terminal equipment.

According to this embodiment, the terminal equipment may monitor the physical downlink control channel (PDCCH) scheduling the first random access response (i.e. MsgB) in the two-step random access procedure transmitted by the network device in a specific time window, hence, confusion of random access responses for different PRACH ROs may be avoided.

In one implementation, the first random access response MsgB may be received as a whole. The physical downlink control channel (PDCCH) scheduling the first random access response may be scrambled by a first random access radio network temporary identifier (RA-RNTI), and a length of the first random access response reception time window is less than or equal to a calculation window length of the random access radio network temporary identifier (RA-RNTI) used for the above scrambling.

In an example of this implementation, as shown in FIG. 3, the method may further include: step 303: the terminal equipment monitors, in the first random access response reception time window, a physical downlink control channel (PDCCH) scheduling a second random access response transmitted by the network device; the second random access response at least contains a TC-RNTI allocated for the terminal equipment and an uplink resource grant used for transmitting an Msg3 of four-step random access by the terminal equipment.

In this example, the physical downlink control channel (PDCCH) scheduling the second random access response (i.e. Msg2) may be scrambled by a second random access radio network temporary identifier (RA-RNTI), the first RA-RNTI and the second RA-RNTI being identical or different. A calculation window length of the second RA-RNTI may be less than or equal to the calculation window length of the first RA-RNTI.

In this example, the length of the reception time window of the first random access response reception time window may be less than or equal to the calculation window length of the second RA-RNTI used for the above scrambling.

In this example, a starting time of the first random access response reception time window may be any one of the following:

1a. a predetermined moment after the terminal equipment transmits the preambles of the first message in the two-step random access procedure, such as a first symbol after transmitting preambles of the first message (MsgA);

2a. a predetermined moment after the terminal equipment transmits the physical uplink shared channel (PUSCH) data of the first message in the two-step random access procedure, such as a first symbol after transmitting PUSCHs of MsgA;

3a. the first PDCCH occasion available for scheduling the first random access response (MsgB) or the second random access response (Msg2) after the preambles of the first message are transmitted, such as an earlier one of the first PDCCH occasion available for scheduling the first random access response (MsgB) and the first PDCCH occasion available for scheduling the second random access response (Msg2) after the preambles of the first message are transmitted; and 4a. the first PDCCH occasion available for scheduling the first random access response (MsgB) or the second random access response (Msg2) after the physical uplink shared channel (PUSCH) data of the first message are transmitted, such as an earlier one of the first PDCCH occasion available for scheduling the first random access response (MsgB) and the first PDCCH occasion available for scheduling the second random access response (Msg2) after the preambles of the first message (MsgA) are transmitted.

In this example, the terminal equipment may start a first timer at the starting time of the first random access response reception time window.

In this example, within the first random access response reception time window, such as during running of the first timer, the terminal equipment monitors the PDCCH based on the first RA-RNTI and the second RA-RNTI respectively; if the terminal equipment receives the PDCCH scrambled by the first RA-RNTI and a media access control layer sub-protocol data unit (MAC subPDU) in a transport block (TB) indicated by the PDCCH containing a preamble identifier matching with a transmitted two-step RACH preamble and MsgB, the terminal equipment determines that the first random access response MsgB is received; and if the terminal equipment receives the PDCCH scrambled by the second RA-RNTI and a media access control layer sub-protocol data unit (MAC subPDU) in a transport block (TB) indicated by the PDCCH containing a preamble identifier matching with a transmitted two-step RACH preamble and Msg2, the terminal equipment determines that the first random access response Msg2 is received.

In this example, in a case where the terminal equipment receives the first random access response (MsgB) or the second random access response (Msg2) within the first random access response reception time window (such as during the running of the first timer), it deems that the random access response is successfully received, hence, it stops monitoring the physical downlink control channel (PDCCH) of the first random access response (MsgB) and the physical downlink control channel (PDCCH) of the second random access response (Msg2).

In addition, when the terminal equipment receives the first random access response (MsgB) or the second random access response (Msg2) in the first random access response reception time window, the terminal equipment may stop the first random access response reception time window, such as closing the first timer.

In addition, in the first random access response reception time window, if MsgB or Msg2 is not received, for example, MsgB or Msg2 is not received until the first timer expires, the terminal equipment may determine that it receives a random access response failure. When the running time of the first timer reaches the length of the first random access response reception time window, it is determined that the first timer expires.

In another example of this implementation, as shown in FIG. 3, the method may further include:

step 304: after transmitting the first message MsgA of the two-step random access procedure to the network device, the terminal equipment monitors, in a second random access response reception time window, a physical downlink control channel (PDCCH) scheduling the second random access response transmitted by the network device.

In this example, at least one of a starting time and an ending time of the second random access response reception time window (for example, the starting time or the ending time of the second random access response reception time window) is different from that of the first random access response reception time window.

For the first random access response reception time window, a time length between its ending time and its starting time is the window length of the first random access response reception time window; and for the second random access response reception time window, a time length between its ending time and its starting time is the window length of the second random access response reception time window.

In this embodiment, timers may be set respectively for the first random access response reception time window and the second random access response reception time window, such as setting a first timer for the first random access response reception time window, and setting a second timer for the second random access response reception time window.

A difference between step 304 and step 303 is: in step 303, the PDCCH scheduling MsgB and the PDCCH scheduling Msg2 are monitored in the first random access response reception time window, while in step 304, the PDCCH scheduling MsgB and the PDCCH scheduling Msg2 are monitored respectively in the first random access response reception time window and the second random access response reception time window independent of each other.

For step 304, the starting time of the first random access response reception time window may be any one of the following moments:

1b. a predetermined moment after the terminal equipment transmits the preambles of the first message (MsgA) in the two-step random access procedure, such as the first symbol after the preambles of the first message (MsgA) are transmitted;

2b. a predetermined moment after the terminal equipment transmits the physical uplink shared channel (PUSCH) data of the first message in the two-step random access procedure, such as the first symbol after the PUSCH of the first message (MsgA) is transmitted;

3b. the first PDCCH occasion available for scheduling the first random access response (MsgB) after the preambles of the first message are transmitted; and 4b. the first PDCCH occasion available for scheduling the first random access response (MsgB) after the physical uplink shared channel (PUSCH) data of the first message (MsgA) are transmitted.

The starting time of the second random access response reception time window may be any one of the following moments:

1c. a predetermined moment after the terminal equipment transmits the preambles of the first message (MsgA) in the two-step random access procedure, such the first symbol after the preambles of the first message (MsgA) are transmitted;

2c. a predetermined moment after the terminal equipment transmits the physical uplink shared channel (PUSCH) data of the first message (MsgA) in the two-step random access procedure, such as the first symbol after the PUSCH of MsgA is transmitted;

3c. a first PDCCH occasion available for scheduling the second random access response (Msg2) after the preambles of the first message (MsgA) are transmitted; and 4c. a first PDCCH occasion available for scheduling the first random access response (Msg2) after the physical uplink shared channel (PUSCH) data of the first message (MsgA) are transmitted.

In addition, in this example, the physical downlink control channel (PDCCH) scheduling the second random access response Msg2 may be scrambled by the second random access radio network temporary identifier (RA-RNTI), and the first RA-RNTI and The second RA-RNTI may be identical or different. The calculation window length of the second RA-RNTI may be less than or equal to the calculation window length of the first RA-RNTI.

In this example, the length of the first random access response reception time window may be less than or equal to the calculation window length of the second RA-RNTI used for the aforementioned scrambling.

In this example, within the first random access response reception time window, such as during the running of the first timer, the terminal equipment monitors the PDCCH based on the first RA-RNTI, and if the terminal equipment receives the PDCCH scrambled by the first RA-RNTI and a media access control layer sub-protocol data unit (MAC subPDU) in a transport block (TB) indicated by the PDCCH contains a preamble identifier matching with the transmitted two-step RACH preamble and MsgB, the terminal equipment determines that the first random access response MsgB is received.

In this example, within the second random access response reception time window, such as during the running of the second timer, the terminal equipment monitors the PDCCH based on the second RA-RNTI; if the terminal equipment receives the PDCCH scrambled by the second RA-RNTI RNTI and a medium access control layer sub-protocol data unit (MAC subPDU) in a transport block (TB) indicated by the PDCCH contains a preamble identifier matching with the transmitted two-step RACH preamble and Msg2, the terminal equipment determines that the second random access response Msg2 is received.

In this example, if the second random access response Msg2 is received in the second random access response reception time window (such as during the running of the second timer), monitoring the physical downlink control channel (PDCCH) of the second random access response Msg2 may be stopped, and monitoring the physical downlink control channel (PDCCH) of the first random access response MsgB may be stopped; furthermore, if monitoring the physical downlink control channel (PDCCH) of the first random access response MsgB has not started, monitoring the physical downlink control channel (PDCCH) of the first random access response MsgB may not be started.

In addition, in a case where the second random access response Msg2 is received in the second random access response reception time window, the terminal equipment may also stop the second random access response reception time window, such as stopping the second timer, and stop the first random access response reception time window, such as stopping the second timer. Moreover, if the first timer has not been started, the first timer may not be started.

In this example, in a case where the first random access response MsgB is received in the first random access response reception time window (such as during the running of the second timer), monitoring the physical downlink control channel (PDCCH) of the first random access response MsgB may be stopped, and monitoring the physical downlink control channel (PDCCH) of the second random access response Msg2 may also be stopped. Moreover, if monitoring the physical downlink control channel (PDCCH) of the second random access response Msg2 has not started, monitoring the physical downlink control channel (PDCCH) of the second random access response Msg2 may not be started.

In addition, in the case where the first random access response MsgB is received in the first random access response reception time window, the terminal equipment may also stop the first random access response reception time window, such as stopping the first timer, and stop the second random access response reception time window, such as stopping the second timer. In addition, if the second timer has not been started, the second timer may not be started.

In addition, if MsgB is not received in the first random access response reception time window, for example, MsgB is not received when the first timer expires, and MsgB is not received in the second random access response reception time window, for example, MsgB is not received when the second timer expires, the terminal equipment may determine that receiving the random access response fails.

According to this embodiment, the terminal equipment may monitor the physical downlink control channel (PDCCH) scheduling the first random access response (i.e. MsgB) in the two-step random access procedure transmitted by the network device in a specific time window, hence, confusion of random access responses for different PRACH ROs may be avoided.

Embodiment 2

The embodiment of this disclosure provides a method for receiving a random access response, which may be carried out by a terminal equipment.

The method for receiving a random access response in Embodiment 2 is similar to the method for receiving a random access response in Embodiment 1, with a difference being that in Embodiment 1, the first random access response MsgB is received as a whole, while in Embodiment 2, the first random access response MsgB has two parts, and correspondingly, the first random access response reception time window also has two parts.

Embodiment 2 shall be described below in detail.

Figure 4:
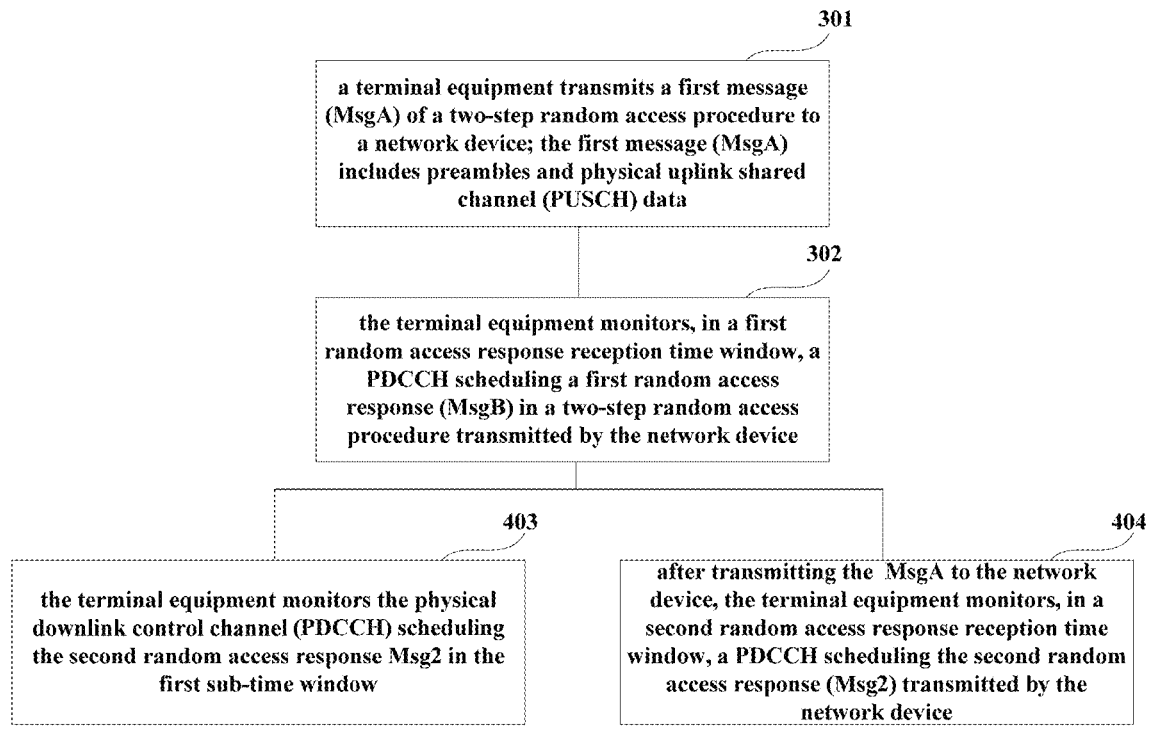
FIG. 4 is a schematic diagram of the method for receiving a random access response of Embodiment 2 of this disclosure.

FIG. 4 is a schematic diagram of the method for receiving a random access response of Embodiment 2.

As shown in FIG. 4, the method includes: step 301 and step 302. Reference may be made to Embodiment 1 for description of step 301 and step 302.

In this embodiment, the first part of the first random access response MsgB at least includes a C-RNTI allocated for the terminal equipment, and the second part of the first random access response MsgB at least includes contention resolution information.

In this embodiment, a PDCCH used for scheduling the first part of the first random access response MsgB may be scrambled by a first RA-RNTI, and a PDCCH used for scheduling the second part of the first random access response MsgB may be scrambled by a C-RNTI.

In this embodiment, the first random access response reception time window includes a first sub-time window and a second sub-time window. In the first sub-time window, the terminal equipment monitors the physical downlink control channel (PDCCH) scheduling the first part of the first random access response MsgB, and in the second sub-time window, the terminal equipment monitors the physical downlink control channel (PDCCH) scheduling the second part of the first random access response MsgB.

In this embodiment, a length of the first sub-time window may be less than or equal to a calculation window length of the first RA-RNTI scrambling the first part of MsgB.

As shown in FIG. 4, the method may further include:

step 403: the terminal equipment monitors the physical downlink control channel (PDCCH) scheduling the second random access response Msg2 in the first sub-time window.

The second random access response Msg2 at least includes a TC-RNTI allocated for the terminal equipment and an uplink resource grant used by the terminal equipment for transmitting Msg3 of a four-step random access.

In this example, the physical downlink control channel (PDCCH) scheduling the second random access response Msg2 may be scrambled by the second random access radio network temporary identifier (RA-RNTI), the first RA-RNTI and the second RA-RNTI may be identical or different. A calculation window length of the second RA-RNTI may be less than or equal to a calculation window length of the first RA-RNTI.

In this example, the length of the second sub-time window may be less than or equal to the calculation window length of the second RA-RNTI used for the above scrambling.

In this example, a starting time of the first random access response reception time window may be any of the following moments:

1d. a predetermined moment after the terminal equipment transmits the preambles of the first message (MsgA) in the two-step random access procedure, such as the first symbol after transmitting preambles of the first message (MsgA);

2d. a predetermined moment after the terminal equipment transmits the physical uplink shared channel (PUSCH) data of the first message (MsgA) in the two-step random access procedure, such as the first symbol after transmitting PUSCHs of MsgA;

3d. the first PDCCH occasion available for scheduling the first part of the first random access response (MsgB) or the second random access response (Msg2) after the preambles of the first message (MsgA) are transmitted, such as an earlier one of the first PDCCH occasion available for scheduling the first part of the first random access response (MsgB) and the first PDCCH occasion available for scheduling the second random access response (Msg2) after the preambles of the first message (MsgA) are transmitted; or 4d. the first PDCCH occasion available for scheduling the first part of the first random access response (MsgB) or the second random access response (Msg2) after the physical uplink shared channel (PUSCH) data of the first message (MsgA) are transmitted, such as an earlier one of the first PDCCH occasion available for scheduling the first part of the first random access response (MsgB) and the first PDCCH occasion available for scheduling the second random access response (Msg2) after the PUSCH data of the first message (MsgA) are transmitted.

In this example, the terminal equipment may start a third timer at the starting time of the first sub-time window of the first random access response reception time window.

In this embodiment, the starting time of the second sub-time window may include: a predetermined moment after the terminal equipment receives the first part in the first sub-time window. For example, the starting time of the second sub-time window may be a first symbol after the terminal equipment receives the first part of MsgB.

In this example, the terminal equipment may start a fourth timer at the starting time of the second sub-time window of the first random access response reception time window.

In this example, within the first sub-time window, such as during running of the third timer, the terminal equipment monitors the PDCCH based on the first RA-RNTI and the second RA-RNTI respectively; if the terminal equipment receives the first part of the first random access response (MsgB) or the second random access response (Msg2) in the first sub-time window, it may stop monitoring the physical uplink control channel (PUCCH) of the first part of the first random access response (MsgB) and the physical uplink control channel (PUCCH) of the second random access response (Msg2).

In addition, when the terminal equipment receives the first part of the first random access response (MsgB) or the second random access response (Msg2) within the first sub-time window, it may also stop the first sub-time window, such as closing the third timer.

When the second sub-time window is started, the terminal equipment may monitor the second part of MsgB in the second sub-time window, such as monitoring the PDCCH scrambled by the C-RNTI during the running of the fourth timer, and if the second part of MsgB is received within the second sub-time window (such as during running of the fourth timer), it stops monitoring the second part of MsgB; and furthermore, the terminal equipment may stop the second sub-time window, such as stopping the fourth timer.

In this embodiment, if neither the first part of MsgB nor Msg2 is received in the first sub-time window, for example, the first part of MsgB or Msg2 is not received until the third timer expires, the terminal equipment may determine that receiving the random access response fails. When the running time of the third timer reaches the length of the first sub-time window, it is determined that the third timer expires.

In this embodiment, if the second part of MsgB is received in the second sub-time window, for example, the second part of MsgB is not received until the fourth timer expires, the terminal equipment may determine that receiving the random access response fails. When the running time of the fourth timer reaches the length of the second sub-time window, it is determined that the fourth timer expires.

In another example of this implementation, as shown in FIG. 4, the method may further include:

step 404: after transmitting the first message MsgA of the two-step random access procedure to the network device, the terminal equipment monitors, in a second random access response reception time window, a physical downlink control channel (PDCCH) scheduling the second random access response (Msg2) transmitted by the network device.

In this example, at least one of a starting time and an ending time of the second random access response reception time window (for example, the starting time or the ending time of the second random access response reception time window) is different from that of the first sub-time window.

For the first sub-time window, the length of time between its ending time and its starting time is the window length of the first sub-time window; and for the second random access response reception time window, the length of time between its ending time and its starting time is the window length of the second random access response reception time window.

In this embodiment, timers may be set respectively for the first sub-time window and the second random access response reception time window. For example, a third timer is set for the first sub-time window, and a second timer is set for the second random access response reception time window.

A difference between step 404 and step 403 is that in step 403, the PDCCH scheduling the first part of MsgB and the PDCCH monitoring Msg2 are monitored in the first sub-time window, while in step 404, the PDCCH scheduling the first part of MsgB and the PDCCH scheduling Msg2 are monitored respectively in the first sub-time window and the second random access response reception time window independent of each other.

For step 404, the starting time of the first sub-time window may be any one of the following moments:

1e. a predetermined moment after the terminal equipment transmits the preambles of the first message (MsgA) in the two-step random access procedure, such as the first symbol after transmitting preambles of the first message (MsgA);

2e. a predetermined moment after the terminal equipment transmits the physical uplink shared channel (PUSCH) data of the first message (MsgA) in the two-step random access procedure, such as the first symbol after transmitting PUSCHs of MsgA;

3e. the first PDCCH occasion available for scheduling the first random access response (MsgB) after the preambles of the first message (MsgA) are transmitted; and 4e. the first PDCCH occasion available for scheduling the first random access response (MsgB) after the physical uplink shared channel (PUSCH) data of the first message (MsgA) are transmitted.

The starting time of the second random access response reception time window may be any one of the following moments:

1f. a predetermined moment after the terminal equipment transmits the preambles of the first message (MsgA) in the two-step random access procedure, such as the first symbol after transmitting preambles of the first message (MsgA);

2f. a predetermined moment after the terminal equipment transmits the physical uplink shared channel (PUSCH) data of the first message (MsgA) in the two-step random access procedure, such as the first symbol after transmitting PUSCHs of MsgA;

3f. the first PDCCH occasion available for scheduling the second random access response (Msg2) after the preambles of the first message (MsgA) are transmitted; and 4f. the first PDCCH occasion available for scheduling the second random access response (Msg2) after the physical uplink shared channel (PUSCH) data of the first message (MsgA) are transmitted.

In addition, in this example, the physical downlink control channel (PDCCH) scheduling the second random access response Msg2 may be scrambled by the second random access radio network temporary identifier (RA-RNTI), and the first RA-RNTI and The second RA-RNTI may be identical or different. The calculation window length of the second RA-RNTI may be less than or equal to the calculation window length of the first RA-RNTI.

In this example, the length of the first sub-time window may be less than or equal to the calculation window length of the second RA-RNTI used for the above scrambling.

In this embodiment, the starting time of the second sub-time window may include a predetermined moment after the terminal equipment receives the first part in the first sub-time window. For example, the starting time of the second sub-time window may be the first symbol after the terminal equipment receives the first part of MsgB.

In this example, in the first sub-time window, such during the running of the third timer, the terminal equipment monitors the PDCCH based on the first RA-RNTI, thereby receiving the first part of the MsgB.

In this example, within the second random access response reception time window, such as during the running of the second timer, the terminal equipment monitors the PDCCH based on the second RA-RNTI, thereby receiving Msg2.

In this example, when the second random access response Msg2 is received in the second random access response reception time window (such as during the running of the second timer), monitoring the physical downlink control channel (PDCCH) of the second random access response MsgB may be stopped, and monitoring the physical downlink control channel (PDCCH) of the first part of the first random access response MsgB may also be stopped; in addition, if monitoring the physical downlink control channel (PDCCH) of the first part of the first random access response MsgB has not been started, monitoring the physical downlink control channel (PDCCH) of the first part of the first random access response MsgB may not be started.

In addition, in the case where the second random access response Msg2 is received in the second random access response reception time window, the terminal equipment may also stop the second random access response reception time window, such as stopping the second timer, and stop the first sub-time window, such as stopping the third timer. In addition, if the third timer has not been started, the third timer may not be started.

In this example, in a case where the first part of the first random access response MsgB is received in the first sub-time window (such as during the running of the third timer), monitoring the physical downlink control channel (PDCCH) of the first part of the first random access response MsgB may be stopped, and monitoring the physical downlink control channel (PDCCH) of the second random access response Msg2 may also be stopped. Moreover, if monitoring the physical downlink control channel (PDCCH) of the second random access response Msg2 has not started, monitoring the physical downlink control channel (PDCCH) of the second random access response Msg2 may not be started.

In addition, in the case where the first part of the first random access response MsgB is received in the first sub-time window, the terminal equipment may also stop the first sub-time window, such as stopping the third timer, and stop the second random access response reception time window, such as stopping the second timer. In addition, if the second timer has not been started, the second timer may not be started.

In the case where the first part of the first random access response MsgB is received in the first sub-time window, the terminal equipment may start the second sub-time window. And in the case where the second sub-time window is started, the terminal equipment may monitor the second part of MsgB in the second sub-time window, such as monitoring the PDCCH scrambled by the C-RNTI during the running of the fourth timer, and if the second part of MsgB is received within the second sub-time window (such as during the running of the fourth timer), monitoring of the second part of MsgB is stopped; and furthermore, the terminal equipment may stop the fourth timer.

In this embodiment, if the first part of MsgB is not received in the first sub-time window and Msg2 is not received in the second random access response reception time window, for example, the first part of MsgB is not received until the third timer expires and Msg2 is not received until the second timer expires, the terminal equipment may determine that receiving the random access response fails. Wherein, when the running time of the third timer reaches the length of the first sub-time window, it is determined that the third timer expires; and when the running time of the second timer reaches the length of the second random access response reception time window, it is determined that the second timer expires.

In this embodiment, if the second part of MsgB is not received in the second sub-time window, for example, the second part of MsgB is not received until the fourth timer expires, the terminal equipment may determine that receiving the random access response fails. Wherein, when the running time of the fourth timer reaches the length of the second sub-time window, it is determined that the fourth timer expires.

According to this embodiment, the terminal equipment may monitor the physical downlink control channel (PDCCH) scheduling the first random access response (i.e. MsgB) in the two-step random access procedure transmitted by the network device in a specific time window, hence, confusion of random access responses for different PRACH ROs may be avoided.

Embodiment 3

The embodiment of this disclosure provides a method for transmitting a random access response, applicable to a network device.

Figure 5:
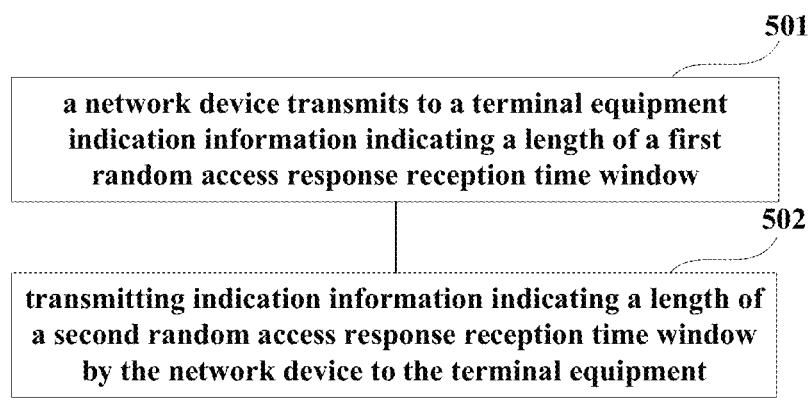
FIG. 5 is a schematic diagram of the method for transmitting a random access response of Embodiment 3 of this disclosure.

FIG. 5 is a schematic diagram of the method for transmitting a random access response of Embodiment 3.

As shown in FIG. 5, the method includes:

step 501: a network device transmits to a terminal equipment indication information indicating a length of a first random access response reception time window.

The first random access response reception time window is used by the terminal equipment in monitoring a physical downlink control channel (PDCCH) scheduling a first random access response in a two-step random access procedure; and the first random access response MsgB at least contains a C-RNTI and contention resolution information allocated for the terminal equipment.

The indication information indicates a length of the first random access response reception time window.

In this embodiment, the physical downlink control channel (PDCCH) scheduling the first random access response is scrambled by a random access radio network temporary identifier (RA-RNTI); and the length of the first random access response reception time window is less than or equal to a calculation window length of the random access radio network temporary identifier (RA-RNTI).

In this embodiment, the first random access response reception time window is further used by the terminal equipment in monitoring the second random access response Msg2; the second random access response Msg2 at least contains a TC-RNTI allocated for the terminal equipment and an uplink resource grant used for transmitting an Msg3 of four-step random access by the terminal equipment.

In this embodiment, the physical downlink control channel (PDCCH) scheduling the first random access response MsgB is scrambled by a first random access radio network temporary identifier (RA-RNTI), the physical downlink control channel (PDCCH) scheduling the second random access response Msg2 is scrambled by a second random access radio network temporary identifier (RA-RNTI). A length of the first random access response reception time window is less than or equal to a calculation window length of the first RA-RNTI and a calculation window length of the second RA-RNTI.

As shown in FIG. 5 the method further includes:

step 502: transmitting indication information indicating a length of a second random access response reception time window by the network device to the terminal equipment.

The second random access response reception time window is used by the terminal equipment in monitoring a physical downlink control channel (PDCCH) scheduling a second random access response; and the second random access response Msg2 at least contains a TC-RNTI allocated for the terminal equipment and an uplink resource grant used for transmitting the Msg3 of the four-step random access by the terminal equipment.

In this embodiment, at least one of a starting time and an ending time of the second random access response reception time window (for example, the starting time or the ending time of the second random access response reception time window) is different from that of the first random access response reception time window.

The physical downlink control channel (PDCCH) scheduling the first random access response MsgB is scrambled by a first random access radio network temporary identifier (RA-RNTI), and the physical downlink control channel (PDCCH) scheduling the second random access response Msg2 is scrambled by a second random access radio network temporary identifier (RA-RNTI).

The length of the first random access response reception time window is less than or equal to the calculation window length of the first RA-RNTI, and the length of the second random access response reception time window is less than or equal to the calculation window length of the second RA-RNTI.

Furthermore, the first RA-RNTI and the second RA-RNTI may be identical, or may be different.

In this embodiment, the first random access response reception time window includes a first sub-time window and a second sub-time window, the first sub-time window is used for the terminal equipment to monitor a physical downlink control channel (PDCCH) scheduling a first part of the first random access response, and the second sub-time window is used for the terminal equipment to monitor a physical downlink control channel (PDCCH) scheduling a second part of the first random access response.

In this embodiment, the first part at least contains a C-RNTI allocated for the terminal equipment, and the second part at least contains contention resolution information. And the indication information in step 501 may indicate a length of the first sub-time window and/or a length of the second sub-time window of the first random access response reception time window.

In this embodiment, the first sub-time window is further used by the terminal equipment in monitoring the physical downlink control channel (PDCCH) scheduling the second random access response; wherein the second random access response Msg2 at least contains a TC-RNTI allocated for the terminal equipment and the uplink resource grant used for transmitting the Msg3 of the four-step random access by the terminal equipment.

In one implementation of this embodiment, the physical downlink control channel (PDCCH) scheduling the first part of the first random access response MsgB may be scrambled by the first random access radio network temporary identifier (RA-RNTI), the physical downlink control channel (PDCCH) scheduling the second random access response Msg2 may be scrambled by the second random access radio network temporary identifier (RA-RNTI), and the physical downlink control channel (PDCCH) scheduling the second part of the first random access response MsgB is scrambled by the C-RNTI; a length of the first sub-time window is less than or equal to the calculation window length of the first RA-RNTI, and the length of the first sub-time window is less than or equal to the calculation window length of the second RA-RNTI.

According to this embodiment, the network device transmits network information to the terminal equipment, and the terminal equipment may monitor the physical downlink control channel (PDCCH) scheduling the first random access response (i.e. MsgB) in the two-step random access procedure transmitted by the network device in a specific time window, hence, confusion of random access responses for different PRACH ROs may be avoided.

Embodiment 4

The embodiment of this disclosure provides a device for transmitting a random access response, corresponding to the methods for transmitting a random access response as described in embodiments 1 and 2. As a principle of the device for solving problems is similar to those of methods of embodiments 1 and 2, reference may be made to implementations of the methods in embodiments 1 and 2 for implementation of this device, with identical parts being not going to be described herein any further.

Figure 6:
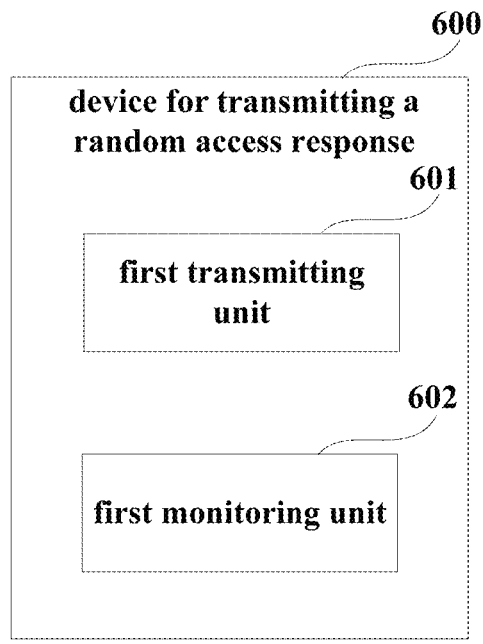
FIG. 6 is a schematic diagram of the device for receiving a random access response of Embodiment 4 of this disclosure.

FIG. 6 is a schematic diagram of the device for transmitting a random access response of Embodiment 4.

As shown in FIG. 6, a device 600 for receiving a random access response includes a first transmitting unit 601 and a first monitoring unit 602.

The first transmitting unit 601 is configured to transmit a first message (MsgA) of a two-step random access procedure to a network device; the first message (MsgA) includes preambles and physical uplink shared channel (PUSCH) data; and the first monitoring unit 602 is configured to monitor in a first random access response reception time window, a physical downlink control channel (PDCCH) scheduling a first random access response (MsgB) in a two-step random access procedure transmitted by the network device; the first random access response MsgB at least contains a C-RNTI and contention resolution information allocated for the terminal equipment.

In this embodiment, the device 600 for transmitting a random access response is configured in a terminal equipment. Reference may be made to the operations of the terminal equipment in embodiments 1 and 2 for description of the device 600.

Embodiment 5

The embodiment of this disclosure provides a device for transmitting a random access response, corresponding to the method for transmitting a random access response as described in Embodiment 3. As a principle of the device for solving problems is similar to that of method of Embodiment 3, reference may be made to implementation of the method in Embodiment 3 for implementation of this device, with identical parts being not going to be described herein any further.

Figure 7:
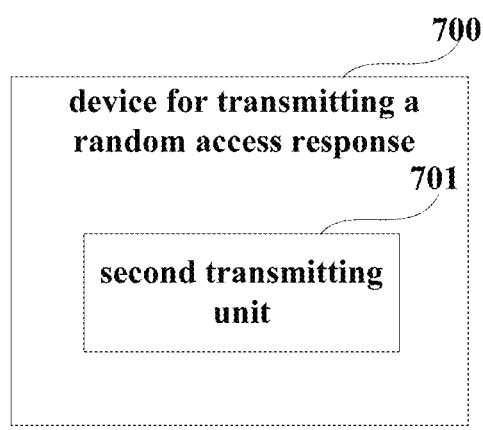
FIG. 7 is a schematic diagram of the device for transmitting a random access response of Embodiment 5 of this disclosure.

FIG. 7 is a schematic diagram of the device for transmitting a random access response of Embodiment 5.

As shown in FIG. 7, a device 700 for transmitting a random access response includes a second transmitting unit 701.

In this embodiment, the second transmitting unit 701 is configured to transmit to a terminal equipment indication information for indicating a length of a first random access response reception time window.

The first random access response reception time window is used by the terminal equipment in monitoring a physical downlink control channel (PDCCH) scheduling a first random access response in a two-step random access procedure; and wherein the first random access response MsgB at least contains a C-RNTI and contention resolution information allocated for the terminal equipment.

In this embodiment, the device 700 for transmitting a random access response is configured in a network device. Reference may be made to the operations of the network device in Embodiment 3 for description of the device 700.

Embodiment 6

The embodiment of this disclosure provides a terminal equipment. As a principle of the equipment for solving problems is similar to that of device of Embodiment 4, reference may be made to implementation of Embodiment 4 for implementation of this equipment, with identical parts being not going to be described herein any further.

Figure 8:
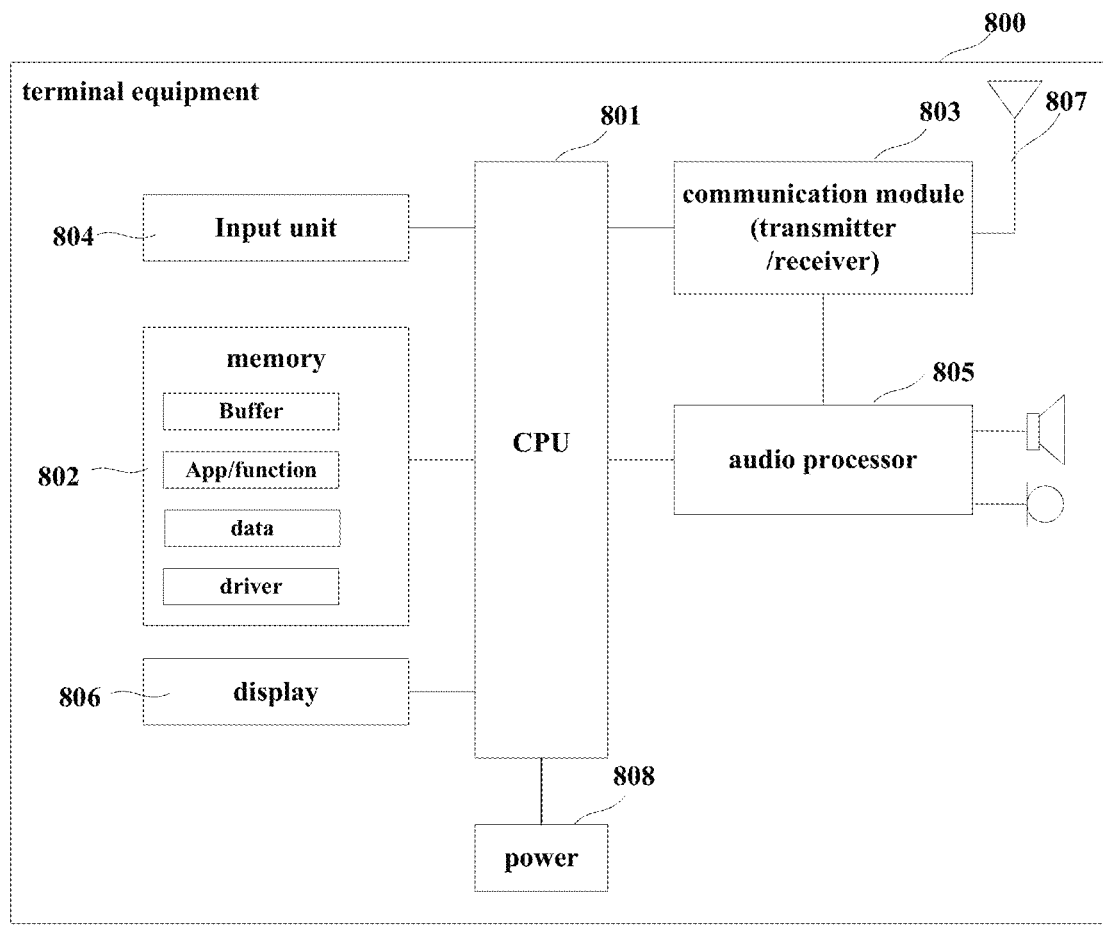
FIG. 8 is a schematic diagram of a structure of the terminal equipment of Embodiment 6 of this disclosure.

FIG. 8 is a schematic diagram of the terminal equipment of the embodiment of this disclosure. As shown in FIG. 8, a terminal equipment 800 may include a central processing unit (CPU) 801 and a memory 802, the memory 802 being coupled to the central processing unit 801. The memory 802 may store various data, and furthermore, it may store a program for data processing, and execute the program under control of the central processing unit 801, so as to indicate to the terminal equipment according to the received signaling.

In one implementation, the functions of the device 600 described in Embodiment 4 may be integrated into the central processing unit 801 of the terminal equipment 800. Wherein, the central processing unit 801 may be configured to carry out the method in Embodiment 1 or 2.

For example, the central processing unit 801 may be configured to perform control so that the terminal equipment 800 carries out the method in Embodiment 1 or 2.

Furthermore, reference may be made to Embodiment 1 or 2 for other configurations of the central processing unit 801, which shall not be described herein any further.

In another implementation, the device 600 and the central processing unit 801 may be configured separately; for example, the device 600 may be configured as a chip connected to the central processing unit 801, such as the unit shown in FIG. 8, and the functions of the device 600 are executed under control of the central processing unit 801.

Furthermore, as shown in FIG. 8, the terminal equipment 800 may include a communication module 803, an input unit 804, a display 806, an audio processor 805, an antenna 807, and a power supply 808, etc.

According to this embodiment, the terminal equipment may monitor the physical downlink control channel (PDCCH) scheduling the first random access response (i.e. MsgB) in the two-step random access procedure transmitted by the network device in a specific time window, hence, confusion of random access responses for different PRACH ROs may be avoided.

Embodiment 7

The embodiment of this disclosure provides a network device. As a principle of the device for solving problems is similar to that of the method of Embodiment 3, reference may be made to implementation of the method of Embodiment 3 for implementation of this device, with identical parts being not going to be described herein any further.

Figure 9:
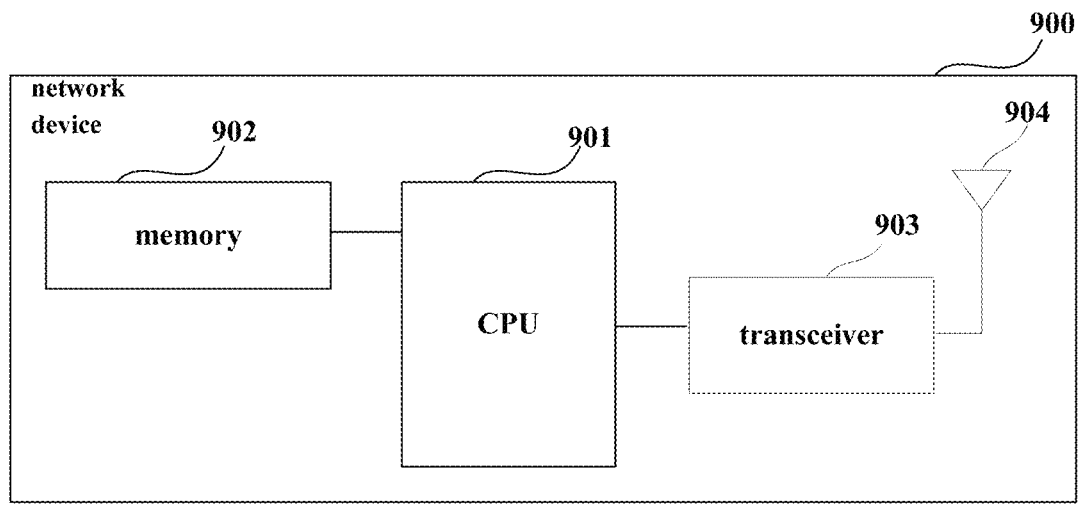
FIG. 9 is a schematic diagram of a structure of the network device of Embodiment 7 of this disclosure.

FIG. 9 is a schematic diagram of a structure of the network device of Embodiment 7 of this disclosure. As shown in FIG. 9, a network device 900 may include a central processing unit (CPU) 901 and a memory 902, the memory 902 being coupled to the central processing unit 901. The memory 902 may store various data, and furthermore, it may store a program for data processing, and execute the program under control of the central processing unit 901.

In one implementation, the functions of the device 700 described in Embodiment 5 may be integrated into the central processing unit 901. The central processing unit 901 may be configured to carry out the method in Embodiment 3.

For example, the central processing unit 901 may be configured to perform control so that the network device 900 carries out the method in Embodiment 3.

Furthermore, reference may be made to Embodiment 3 for other configurations of the central processing unit 901, which shall not be described herein any further.

In another implementation, the device 700 and the central processing unit 901 may be configured separately; for example, the device 700 may be configured as a chip connected to the central processing unit 901, such as the unit shown in FIG. 9, and the functions of the device 700 are executed under control of the central processing unit 901.

Furthermore, as shown in FIG. 9, the network device 900 may include a transceiver 903, an antenna 904, a display, an audio process, and a power supply, etc.; wherein functions of the above components are similar to those in the related art, and shall not be described herein any further. It should be noted that the network device 900 does not necessarily include all the parts shown in FIG. 9. Furthermore, the network device 900 may include parts not shown in FIG. 9, and the related art may be referred to.

Embodiment 8

The embodiment of this disclosure provides a communication system, at least including the network device 900 as described in Embodiment 7 and the terminal equipment 800 as described in Embodiment 6, contents of Embodiment 7 and Embodiment 6 being incorporated herein, which shall not be described herein any further.

An embodiment of this disclosure provides a computer storage medium, including a computer readable program, which will cause a device for receiving a random access response or a terminal equipment to carry out the method for receiving a random access response as described in Embodiment 1 or 2.

An embodiment of the present disclosure provides a computer readable program, which, when executed in a device for receiving a random access response or a terminal equipment, will cause the device for receiving a random access response or the terminal equipment to carry out the method for receiving a random access response as described in Embodiment 1 or 2.

An embodiment of this disclosure provides a computer storage medium, including a computer readable program, which will cause a device for transmitting a random access response or a network device to carry out the method for transmitting a random access response as described in Embodiment 3.

An embodiment of the present disclosure provides a computer readable program, which, when executed in a device for transmitting a random access response or a network device, will cause the device for transmitting a random access response or the network device to carry out the method for transmitting a random access response as described in Embodiment 3.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIGS. 6 and 7 may either correspond to software modules of procedures of a computer program, or correspond to hardware modules. Such software modules may respectively correspond to the steps shown in FIG. 2. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 6 and 7 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIGS. 6 and 7 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of this disclosure. Various variants and modifications may be made by those skilled in the art according to the principle of this disclosure, and such variants and modifications fall within the scope of this disclosure.

Following supplements are further provided in this disclosure.

1. A method for receiving a random access response, applicable to a terminal equipment, the method including:

transmitting a first message (MsgA) of a two-step random access procedure to a network device; wherein the first message (MsgA) includes preambles and physical uplink shared channel (PUSCH) data; and monitoring by the terminal equipment in a first random access response reception time window, a physical downlink control channel (PDCCH) scheduling a first random access response (MsgB) in a two-step random access procedure transmitted by the network device; wherein the first random access response MsgB at least contains a C-RNTI and contention resolution information allocated for the terminal equipment.

2. The method according to supplement 1, wherein, the physical downlink control channel (PDCCH) scheduling the first random access response is scrambled by a random access radio network temporary identifier (RA-RNTI);

and a length of the first random access response reception time window is less than or equal to a calculation window length of the random access radio network temporary identifier (RA-RNTI).

3. The method according to supplement 1, wherein the method further includes:

monitoring by the terminal equipment in the first random access response reception time window, a physical downlink control channel (PDCCH) scheduling a second random access response (Msg2) transmitted by the network device; wherein the second random access response Msg2 at least contains a TC-RNTI allocated for the terminal equipment and an uplink resource grant used for transmitting an Msg3 of four-step random access by the terminal equipment.

4. The method according to supplement 3, wherein a starting time of the first random access response reception time window includes:

a predetermined moment after the terminal equipment transmits the preambles of the first message in the two-step random access procedure;

a predetermined moment after the terminal equipment transmits the physical uplink shared channel (PUSCH) data of the first message in the two-step random access procedure;

a first PDCCH occasion available for scheduling the first random access response or the second random access response after the preambles of the first message are transmitted; or a first PDCCH occasion available for scheduling the first random access response or the second random access response after the physical uplink shared channel (PUSCH) data of the first message are transmitted.

5. The method according to supplement 3, wherein, the physical downlink control channel (PDCCH) scheduling the first random access response MsgB is scrambled by a first random access radio network temporary identifier (RA-RNTI);

the physical downlink control channel (PDCCH) scheduling the second random access response Msg2 is scrambled by a second random access radio network temporary identifier (RA-RNTI);

and, a length of the first random access response reception time window is less than or equal to a calculation window length of the first RA-RNTI and a calculation window length of the second RA-RNTI.

6. The method according to supplement 5, wherein the calculation window length of the second RA-RNTI is less than or equal to the calculation window length of the first RA-RNTI.

7. The method according to supplement 3, wherein, when the terminal equipment receives the first random access response or the second random access response in the first random access response reception time window, the terminal equipment stops monitoring a physical downlink control channel (PDCCH) of the first random access response and a physical downlink control channel (PDCCH) of the second random access response.

8. The method according to supplement 1, wherein the method further includes:

after transmitting the first message MsgA of the two-step random access procedure to the network device, monitoring by the terminal equipment in a second random access response reception time window, a physical downlink control channel (PDCCH) scheduling the second random access response transmitted by the network device; wherein the second random access response Msg2 at least contains a TC-RNTI allocated for the terminal equipment and an uplink resource grant used for transmitting the Msg3 of the four-step random access by the terminal equipment;

wherein a starting time or an ending time of the second random access response reception time window is different from that of the first random access response reception time window.

9. The method according to supplement 8, wherein the starting time of the first random access response reception time window includes:

a predetermined moment after the terminal equipment transmits the preambles of the first message in the two-step random access procedure;

a predetermined moment after the terminal equipment transmits the physical uplink shared channel (PUSCH) data of the first message in the two-step random access procedure;

a first PDCCH occasion available for scheduling the first random access response after the preambles of the first message are transmitted; or a first PDCCH occasion available for scheduling the first random access response after the physical uplink shared channel (PUSCH) data of the first message are transmitted.

10. The method according to supplement 8, wherein the starting time of the second random access response reception time window includes:

a predetermined moment after the terminal equipment transmits the preambles of the first message in the two-step random access procedure;

a predetermined moment after the terminal equipment transmits the physical uplink shared channel (PUSCH) data of the first message in the two-step random access procedure;

a first PDCCH occasion available for scheduling the second random access response after the preambles of the first message are transmitted; or a first PDCCH occasion available for scheduling the second random access response after the physical uplink shared channel (PUSCH) data of the first message are transmitted.

11. The method according to supplement 8, wherein, the physical downlink control channel (PDCCH) scheduling the first random access response MsgB is scrambled by the first random access radio network temporary identifier (RA-RNTI);

the physical downlink control channel (PDCCH) scheduling the second random access response Msg2 is scrambled by the second random access radio network temporary identifier (RA-RNTI);

and, a length of the first random access response reception time window is less than or equal to a calculation window length of the first RA-RNTI, and a length of the second random access response reception time window is less than or equal to a calculation window length of the second RA-RNTI.

12. The method according to supplement 8, wherein, when the terminal equipment receives the second random access response in the second random access response reception time window, the terminal equipment stops monitoring a physical downlink control channel (PDCCH) of the second random access response, and stops monitoring or does not start to monitor the physical downlink control channel (PDCCH) of the first random access response.

13. The method according to supplement 8, wherein, when the terminal equipment receives the first random access response in the first random access response reception time window, the terminal equipment stops monitoring the physical downlink control channel (PDCCH) of the first random access response, and stops monitoring or does not start to monitor the physical downlink control channel (PDCCH) of the second random access response.

14. The method according to supplement 1, wherein, the first random access response reception time window includes a first sub-time window and a second sub-time window;

and in the first sub-time window, the terminal equipment monitors a physical downlink control channel (PDCCH) scheduling a first part of the first random access response, and in the second sub-time window, the terminal equipment monitors a physical downlink control channel (PDCCH) scheduling a second part of the first random access response;

wherein the first part at least contains a C-RNTI allocated for the terminal equipment, and the second part at least contains the contention resolution information.

15. The method according to supplement 14, wherein the method further includes:

monitoring by the terminal equipment in the first sub-time window, a physical downlink control channel (PDCCH) scheduling the second random access response; wherein the second random access response Msg2 at least contains a TC-RNTI allocated for the terminal equipment and an uplink resource grant used for transmitting the Msg3 of the four-step random access by the terminal equipment.

16. The method according to supplement 15, wherein a starting time of the first sub-time window includes:

a predetermined moment after the terminal equipment transmits the preambles of the first message in the two-step random access procedure;

a predetermined moment after the terminal equipment transmits the physical uplink shared channel (PUSCH) data of the first message in the two-step random access procedure;

a first PDCCH occasion available for scheduling the first part of the first random access response or the second random access response after the preambles of the first message are transmitted; or a first PDCCH occasion available for scheduling the first part of the first random access response or the second random access response after the physical uplink shared channel (PUSCH) data of the first message are transmitted.

17. The method according to supplement 15, wherein, the physical downlink control channel (PDCCH) scheduling the first part of the first random access response is scrambled by a random access radio network temporary identifier (RA-RNTI);

the physical downlink control channel (PDCCH) scheduling the second random access response Msg2 is scrambled by the second random access radio network temporary identifier (RA-RNTI);

the physical downlink control channel (PDCCH) scheduling the second part of the first random access response MsgB is scrambled by the C-RNTI; and a length of the first sub-time window is less than or equal to the calculation window length of the first RA-RNTI and the calculation window length of the second RA-RNTI.

18. The method according to supplement 17, wherein the calculation window length of the second RA-RNTI is less than or equal to the calculation window length of the first RA-RNTI.

19. The method according to supplement 15, wherein a starting time of the second sub-time window includes:

a predetermined moment after the terminal equipment receives the first part in the first sub-time window.

20. The method according to supplement 15, wherein, in a case where the terminal equipment receives the first part or the second random access response in the first sub-time window, the terminal equipment stops monitoring a physical downlink control channel (PDCCH) of the first part and the physical downlink control channel (PDCCH) of the second random access response.

21. The method according to supplement 14, wherein the method further includes:

after transmitting the first message MsgA of the two-step random access procedure to the network device, monitoring by the terminal equipment in the second random access response reception time window, the physical downlink control channel (PDCCH) scheduling the second random access response transmitted by the network device; wherein the second random access response Msg2 at least contains a TC-RNTI allocated for the terminal equipment and the uplink resource grant used for transmitting the Msg3 of the four-step random access by the terminal equipment;

wherein the starting time or the ending time of the second random access response reception time window is different from that of the first sub-time window.

22. The method according to supplement 21, wherein a starting time of the first sub-time window includes:
- a predetermined moment after the terminal equipment transmits the preambles of the first message in the two-step random access procedure;
- a predetermined moment after the terminal equipment transmits the physical uplink shared channel (PUSCH) data of the first message in the two-step random access procedure;
- a first PDCCH occasion available for scheduling the first part after the preambles of the first message are transmitted; or
- a first PDCCH occasion available for scheduling the first part after the physical uplink shared channel (PUSCH) data of the first message are transmitted.

23. The method according to supplement 21, wherein a starting time of the second random access response reception time window includes:
- a predetermined moment after the terminal equipment transmits the preambles of the first message in the two-step random access procedure;
- a predetermined moment after the terminal equipment transmits the physical uplink shared channel (PUSCH) data of the first message in the two-step random access procedure;
- a first PDCCH occasion available for scheduling the second random access response after the preambles of the first message are transmitted; or
- a first PDCCH occasion available for scheduling the second random access response after the physical uplink shared channel (PUSCH) data of the first message of the first message are transmitted.

24. The method according to supplement 21, wherein,
the physical downlink control channel (PDCCH) scheduling the first part is scrambled by the first random access radio network temporary identifier (RA-RNTI);
the physical downlink control channel (PDCCH) scheduling the second random access response Msg2 is scrambled by the second random access radio network temporary identifier (RA-RNTI);
and,
a length of the first sub-time window is less than or equal to the calculation window length of the first RA-RNTI, and a length of the second random access response reception time window is less than or equal to the calculation window length of the second RA-RNTI.

25. The method according to supplement 21, wherein a starting time of the second sub-time window includes:
- a predetermined moment after the terminal equipment receives the first part of the first random access response in the first sub-time window.

26. The method according to supplement 21, wherein,
when the terminal equipment receives the second random access response in the second random access response reception time window,
the terminal equipment stops monitoring the physical downlink control channel (PDCCH) of the second random access response, and stops monitoring or does not start to monitor the physical downlink control channel (PDCCH) of the first part.

27. The method according to supplement 21, wherein,
when the terminal equipment receives the first part of the first random access response in the first sub-time window,
the terminal equipment stops monitoring the physical downlink control channel (PDCCH) of the first part, and stops monitoring or does not start to monitor the physical downlink control channel (PDCCH) of the second random access response.

28. A method for transmitting a random access response, applicable to a network device, the method including:
transmitting indication information indicating a length of a first random access response reception time window by a network device to a terminal equipment,
the first random access response reception time window being used by the terminal equipment in monitoring a physical downlink control channel (PDCCH) scheduling a first random access response in a two-step random access procedure; wherein the first random access response MsgB at least contains a C-RNTI and contention resolution information allocated for the terminal equipment.

29. The method according to supplement 28, wherein,
the indication information indicates a length of the first random access response reception time window.

30. The method according to supplement 28, wherein,
the physical downlink control channel (PDCCH) scheduling the first random access response is scrambled by a random access radio network temporary identifier (RA-RNTI);
and the length of the first random access response reception time window is less than or equal to a calculation window length of the random access radio network temporary identifier (RA-RNTI).

31. The method according to supplement 28, wherein the first random access response reception time window is further used by the terminal equipment in monitoring the second random access response Msg2; wherein the second random access response Msg2 at least contains a TC-RNTI allocated for the terminal equipment and an uplink resource grant used for transmitting an Msg3 of four-step random access by the terminal equipment.

32. The method according to supplement 31, wherein the physical downlink control channel (PDCCH) scheduling the first random access response MsgB is scrambled by a first random access radio network temporary identifier (RA-RNTI);
the physical downlink control channel (PDCCH) scheduling the second random access response Msg2 is scrambled by a second random access radio network temporary identifier (RA-RNTI);
and,
a length of the first random access response reception time window is less than or equal to a calculation window length of the first RA-RNTI and a calculation window length of the second RA-RNTI.

33. The method according to supplement 28, wherein the method further includes:
transmitting indication information indicating a length of a second random access response reception time window by the network device to the terminal equipment,
the second random access response reception time window being used by the terminal equipment in monitoring a physical downlink control channel (PDCCH) scheduling a second random access response; wherein the second random access response Msg2 at least contains a TC-RNTI allocated for the terminal equipment and an uplink resource grant used for transmitting the Msg3 of the four-step random access by the terminal equipment;
wherein a starting time or an ending time of the second random access response reception time window is different from that of the first random access response reception time window.

34. The method according to supplement 33, wherein,
the physical downlink control channel (PDCCH) scheduling the first random access response MsgB is scrambled by a first random access radio network temporary identifier (RA-RNTI);
the physical downlink control channel (PDCCH) scheduling the second random access response Msg2 is scrambled by a second random access radio network temporary identifier (RA-RNTI);
and,
the length of the first random access response reception time window is less than or equal to the calculation window length of the first RA-RNTI, and the length of the second random access response reception time window is less than or equal to the calculation window length of the second RA-RNTI.

35. The method according to supplement 28, wherein,
the first random access response reception time window includes a first sub-time window and a second sub-time window,
the first sub-time window being used for the terminal equipment to monitor a physical downlink control channel (PDCCH) scheduling a first part of the first random access response,
and the second sub-time window being used for the terminal equipment to monitor a physical downlink control channel (PDCCH) scheduling a second part of the first random access response;
wherein the first part at least contains a C-RNTI allocated for the terminal equipment, and the second part at least contains contention resolution information,
and the indication information indicates a length of the first sub-time window and/or a length of the second sub-time window of the first random access response reception time window.

36. The method according to supplement 35, wherein,
the first sub-time window is further used by the terminal equipment in monitoring the physical downlink control channel (PDCCH) scheduling the second random access response; wherein the second random access response Msg2 at least contains a TC-RNTI allocated for the terminal equipment and the uplink resource grant used for transmitting the Msg3 of the four-step random access by the terminal equipment.

37. The method according to supplement 36, wherein,
the physical downlink control channel (PDCCH) scheduling the first part of the first random access response MsgB is scrambled by the first random access radio network temporary identifier (RA-RNTI);
the physical downlink control channel (PDCCH) scheduling the second random access response Msg2 is scrambled by the second random access radio network temporary identifier (RA-RNTI);
the physical downlink control channel (PDCCH) scheduling the second part of the first random access response MsgB is scrambled by the C-RNTI; and
a length of the first sub-time window is less than or equal to the calculation window length of the first RA-RNTI and the calculation window length of the second RA-RNTI.

1a. A device for receiving a random access response, applicable to a terminal equipment, the device including:
a first transmitting unit, configured to transmit a first message (MsgA) of a two-step random access procedure to a network device; wherein the first message (MsgA) includes preambles and physical uplink shared channel (PUSCH) data; and
a first monitoring unit, configured to monitor in a first random access response reception time window, a physical downlink control channel (PDCCH) scheduling a first random access response (MsgB) in a two-step random access procedure transmitted by the network device; wherein the first random access response MsgB at least contains a C-RNTI and contention resolution information allocated for the terminal equipment.

2a. The device according to supplement 1a, wherein,
the physical downlink control channel (PDCCH) scheduling the first random access response is scrambled by a random access radio network temporary identifier (RA-RNTI);
and a length of the first random access response reception time window is less than or equal to a calculation window length of the random access radio network temporary identifier (RA-RNTI).

3a. The device according to supplement 1a, wherein,
after transmitting the first message MsgA of the two-step random access procedure to the network device,
monitoring by the first monitoring unit in the second random access response reception time window, a physical downlink control channel (PDCCH) scheduling a second random access response (Msg2) transmitted by the network device; wherein the second random access response Msg2 at least contains a TC-RNTI allocated for the terminal equipment and an uplink resource grant used for transmitting an Msg3 of four-step random access by the terminal equipment,
wherein a starting time or an ending time of the second random access response reception time window is different from that of the first random access response reception time window.

4a. The device according to supplement 3a, wherein a starting time of the first random access response reception time window includes:
a predetermined moment after the terminal equipment transmits the preambles of the first message in the two-step random access procedure;
a predetermined moment after the terminal equipment transmits the physical uplink shared channel (PUSCH) data of the first message in the two-step random access procedure;
a first PDCCH occasion available for scheduling the first random access response or the second random access response after the preambles of the first message are transmitted; or
a first PDCCH occasion available for scheduling the first random access response or the second random access response after the physical uplink shared channel (PUSCH) data of the first message are transmitted.

5a. The device according to supplement 3a, wherein the starting time of the second random access response reception time window includes:
a predetermined moment after the terminal equipment transmits the preambles of the first message in the two-step random access procedure;
a predetermined moment after the terminal equipment transmits the physical uplink shared channel (PUSCH) data of the first message in the two-step random access procedure;
a first PDCCH occasion available for scheduling the second random access response after the preambles of the first message are transmitted; or a first PDCCH occasion available for scheduling the second random access response after the physical uplink shared channel (PUSCH) data of the first message are transmitted.

6a. The device according to supplement 1a, wherein,
the first random access response reception time window includes a first sub-time window and a second sub-time window;
and in the first sub-time window,
the terminal equipment monitors a physical downlink control channel (PDCCH) scheduling a first part of the first random access response,
and in the second sub-time window,
the terminal equipment monitors a physical downlink control channel (PDCCH) scheduling a second part of the first random access response;
wherein the first part at least contains a C-RNTI allocated for the terminal equipment, and the second part at least contains the contention resolution information.

7a. The device according to supplement 6a, wherein the device further includes:
monitoring by the first monitoring unit in the first sub-time window, a physical downlink control channel (PDCCH) scheduling the second random access response; wherein the second random access response Msg2 at least contains a TC-RNTI allocated for the terminal equipment and an uplink resource grant used for transmitting the Msg3 of the four-step random access by the terminal equipment.

8a. The device according to supplement 7a, wherein a starting time of the first sub-time window includes:
a predetermined moment after the terminal equipment transmits the preambles of the first message in the two-step random access procedure;
a predetermined moment after the terminal equipment transmits the physical uplink shared channel (PUSCH) data of the first message in the two-step random access procedure;
a first PDCCH occasion available for scheduling the first part of the first random access response or the second random access response after the preambles of the first message are transmitted; or
a first PDCCH occasion available for scheduling the first part of the first random access response or the second random access response after the physical uplink shared channel (PUSCH) data of the first message are transmitted.

9a. The device according to supplement 7a, wherein,
the physical downlink control channel (PDCCH) scheduling the first part of the first random access response is scrambled by a random access radio network temporary identifier (RA-RNTI);
the physical downlink control channel (PDCCH) scheduling the second random access response Msg2 is scrambled by the second random access radio network temporary identifier (RA-RNTI);
the physical downlink control channel (PDCCH) scheduling the second part of the first random access response MsgB is scrambled by the C-RNTI; and
a length of the first sub-time window is less than or equal to the calculation window length of the first RA-RNTI and the calculation window length of the second RA-RNTI.

10a. The device according to supplement 9a, wherein the calculation window length of the second RA-RNTI is less than or equal to the calculation window length of the first RA-RNTI.

11a. The device according to supplement 7a, wherein a starting time of the second sub-time window includes:
a predetermined moment after the terminal equipment receives the first part in the first sub-time window.

12a. The device according to supplement 6a, wherein,
after transmitting the first message MsgA of the two-step random access procedure to the network device,
monitoring by the terminal equipment in the second random access response reception time window, the physical downlink control channel (PDCCH) scheduling the second random access response transmitted by the network device; wherein the second random access response Msg2 at least contains a TC-RNTI allocated for the terminal equipment and the uplink resource grant used for transmitting the Msg3 of the four-step random access by the terminal equipment;
wherein the starting time or the ending time of the second random access response reception time window is different from that of the first sub-time window.

13a. The device according to supplement 12a, wherein a starting time of the first sub-time window includes:
a predetermined moment after the terminal equipment transmits the preambles of the first message in the two-step random access procedure;
a predetermined moment after the terminal equipment transmits the physical uplink shared channel (PUSCH) data of the first message in the two-step random access procedure;
a first PDCCH occasion available for scheduling the first part after the preambles of the first message are transmitted; or
a first PDCCH occasion available for scheduling the first part after the physical uplink shared channel (PUSCH) data of the first message are transmitted.

14a. The device according to supplement 12a, wherein a starting time of the second random access response reception time window includes:
a predetermined moment after the terminal equipment transmits the preambles of the first message in the two-step random access procedure;
a predetermined moment after the terminal equipment transmits the physical uplink shared channel (PUSCH) data of the first message in the two-step random access procedure;
a first PDCCH occasion available for scheduling the second random access response after the preambles of the first message are transmitted; or
a first PDCCH occasion available for scheduling the second random access response after the physical uplink shared channel (PUSCH) data of the first message of the first message are transmitted.

15a. The device according to supplement 12a, wherein,
when the first monitoring unit receives the second random access response in the second random access response reception time window,
the first monitoring unit stops monitoring the physical downlink control channel (PDCCH) of the second random access response, and stops monitoring or does not start to monitor the physical downlink control channel (PDCCH) of the first part.

16a. The device according to supplement 12a, wherein,
when the first monitoring unit receives the first part of the first random access response in the first sub-time window,
the first monitoring unit stops monitoring the physical downlink control channel (PDCCH) of the first part, and stops monitoring or does not start to monitor the physical downlink control channel (PDCCH) of the second random access response.

17a. A device for transmitting a random access response, applicable to a network device, the device including:
a second transmitting unit, configured to transmit indication information indicating a length of a first random access response reception time window by a network device to a terminal equipment,
the first random access response reception time window being used by the terminal equipment in monitoring a physical downlink control channel (PDCCH) scheduling a first random access response in a two-step random access procedure; wherein the first random access response MsgB at least contains a C-RNTI and contention resolution information allocated for the terminal equipment.

18a. The device according to supplement 17a, wherein, the indication information indicates a length of the first random access response reception time window.

19a. The device according to supplement 17a, wherein, the physical downlink control channel (PDCCH) scheduling the first random access response is scrambled by a random access radio network temporary identifier (RA-RNTI);
and the length of the first random access response reception time window is less than or equal to a calculation window length of the random access radio network temporary identifier (RA-RNTI).

20a. The device according to supplement 17a, wherein, the first random access response reception time window is further used by the terminal equipment in monitoring the second random access response Msg2; wherein the second random access response Msg2 at least contains a TC-RNTI allocated for the terminal equipment and an uplink resource grant used for transmitting an Msg3 of four-step random access by the terminal equipment.

21a. The device according to supplement 20a, wherein, the physical downlink control channel (PDCCH) scheduling the first random access response MsgB is scrambled by a first random access radio network temporary identifier (RA-RNTI);
the physical downlink control channel (PDCCH) scheduling the second random access response Msg2 is scrambled by a second random access radio network temporary identifier (RA-RNTI);
and,
a length of the first random access response reception time window is less than or equal to a calculation window length of the first RA-RNTI and a calculation window length of the second RA-RNTI.

22a. The device according to supplement 17a, wherein, the second transmitting unit further transmits indication information indicating a length of a second random access response reception time window by the network device to the terminal equipment, the second random access response reception time window being used by the terminal equipment in monitoring a physical downlink control channel (PDCCH) scheduling a second random access response; wherein the second random access response Msg2 at least contains a TC-RNTI allocated for the terminal equipment and an uplink resource grant used for transmitting the Msg3 of the four-step random access by the terminal equipment;
wherein a starting time or an ending time of the second random access response reception time window is different from that of the first random access response reception time window.

23a. The device according to supplement 22a, wherein, the physical downlink control channel (PDCCH) scheduling the first random access response MsgB is scrambled by a first random access radio network temporary identifier (RA-RNTI);
the physical downlink control channel (PDCCH) scheduling the second random access response Msg2 is scrambled by a second random access radio network temporary identifier (RA-RNTI);
and,
the length of the first random access response reception time window is less than or equal to the calculation window length of the first RA-RNTI, and the length of the second random access response reception time window is less than or equal to the calculation window length of the second RA-RNTI.

24a. The device according to supplement 17a, wherein, the first random access response reception time window includes a first sub-time window and a second sub-time window,
the first sub-time window being used for the terminal equipment to monitor a physical downlink control channel (PDCCH) scheduling a first part of the first random access response,
and the second sub-time window being used for the terminal equipment to monitor a physical downlink control channel (PDCCH) scheduling a second part of the first random access response;
wherein the first part at least contains a C-RNTI allocated for the terminal equipment, and the second part at least contains contention resolution information,
and the indication information indicates a length of the first sub-time window and/or a length of the second sub-time window of the first random access response reception time window.

25a. The device according to supplement 24a, wherein, the first sub-time window is further used by the terminal equipment in monitoring the physical downlink control channel (PDCCH) scheduling the second random access response; wherein the second random access response Msg2 at least contains a TC-RNTI allocated for the terminal equipment and the uplink resource grant used for transmitting the Msg3 of the four-step random access by the terminal equipment.

26a. The device according to supplement 25a, wherein, the physical downlink control channel (PDCCH) scheduling the first part of the first random access response MsgB is scrambled by the first random access radio network temporary identifier (RA-RNTI);
the physical downlink control channel (PDCCH) scheduling the second random access response Msg2 is scrambled by the second random access radio network temporary identifier (RA-RNTI);
the physical downlink control channel (PDCCH) scheduling the second part of the first random access response MsgB is scrambled by the C-RNTI; and
a length of the first sub-time window is less than or equal to the calculation window length of the first RA-RNTI and the calculation window length of the second RA-RNTI.

The invention claimed is:
1. A device for receiving a random access response, applicable to a terminal equipment, the device comprising:
a transmitter configured to transmit a first message (MsgA) of a two-step random access procedure to a network device; wherein the first message (MsgA) comprises a preamble and physical uplink shared channel (PUSCH) data; and a monitor configured to monitor, in a first random access response reception time window, a physical downlink control channel (PDCCH) scheduling a first random access response in a two-step random access procedure transmitted by the network device, the first random access response at least containing a C-RNTI and contention resolution information allocated for the terminal equipment, wherein the monitor is further configured to monitor, in the first random access response reception time window, a physical downlink control channel (PDCCH) scheduling a second random access response transmitted by the network device, the second random access response at least containing a TC-RNTI allocated for the terminal equipment and an uplink resource grant used for transmitting the Msg3 of a four-step random access by the terminal equipment, and when the monitor receives the first random access response or the second random access response in the first random access response reception time window, the monitor stops monitoring:
  the physical downlink control channel (PDCCH) scheduling the first random access response, and
  the physical downlink control channel (PDCCH) scheduling the second random access response.

2. The device according to claim 1, wherein a starting time of the first random access response reception time window comprises:
  a predetermined moment after the terminal equipment transmits the preamble of the first message in the two-step random access procedure;
  a predetermined moment after the terminal equipment transmits the physical uplink shared channel (PUSCH) data of the first message in the two-step random access procedure;
  the first PDCCH occasion available for scheduling the first random access response or the second random access response after the preamble of the first message is transmitted; or
  the first PDCCH occasion available for scheduling the first random access response or the second random access response after the physical uplink shared channel (PUSCH) data of the first message are transmitted.

3. The device according to claim 1,
after transmitting the first message MsgA of the two-step random access procedure to the network device,
the monitor monitors in a second random access response reception time window, a physical downlink control channel (PDCCH) scheduling the second random access response transmitted by the network device; wherein the second random access response at least contains a TC-RNTI allocated for the terminal equipment and an uplink resource grant used for transmitting the Msg3 of the four-step random access by the terminal equipment;
wherein a starting time or an ending time of the second random access response reception time window is different from that of the first random access response reception time window.

4. The device according to claim 3, wherein,
when the monitor receives the second random access response in the second random access response reception time window,
the monitor stops monitoring the physical downlink control channel (PDCCH) of the second random access response, and stops monitoring or does not start to monitor the physical downlink control channel (PDCCH) of the first random access response.

5. The device according to claim 3, wherein,
when the monitor receives the first random access response in the first random access response reception time window,
the monitor stops monitoring the physical downlink control channel (PDCCH) of the first random access response, and stops monitoring or does not start to monitor the physical downlink control channel (PDCCH) of the second random access response.

6. The device according to claim 1, wherein,
the first random access response reception time window comprises a first sub-time window and a second sub-time window;
and in the first sub-time window,
the monitor monitors a physical downlink control channel (PDCCH) scheduling a first part of the first random access response,
and in the second sub-time window,
the monitor monitors a physical downlink control channel (PDCCH) scheduling a second part of the first random access response;
wherein the first part at least contains the C-RNTI allocated for the terminal equipment, and the second part at least contains the contention resolution information.

7. The device according to claim 6, wherein,
the monitor monitors in the first sub-time window, a physical downlink control channel (PDCCH) scheduling the second random access response; wherein the second random access response at least contains a TC-RNTI allocated for the terminal equipment and an uplink resource grant used for transmitting the Msg3 of the four-step random access by the terminal equipment.

8. The device according to claim 6, wherein,
after transmitting the first message MsgA of the two-step random access procedure to the network device,
monitoring by the monitor in the second random access response reception time window, the physical downlink control channel (PDCCH) scheduling the second random access response transmitted by the network device; wherein the second random access response at least contains a TC-RNTI allocated for the terminal equipment and the uplink resource grant used for transmitting the Msg3 of the four-step random access by the terminal equipment;
wherein the starting time or the ending time of the second random access response reception time window is different from that of the first sub-time window.

9. The device according to claim 8, wherein a starting time of the second sub-time window comprises:
  a predetermined moment after the monitor receives the first part of the first random access response in the first sub-time window.

10. A device for transmitting a random access response, applicable to a network device, the device comprising:
  a transmitter configured to transmit indication information indicating a length of a first random access response reception time window to a terminal equipment,
  the first random access response reception time window being used by the terminal equipment in monitoring a physical downlink control channel (PDCCH) scheduling a first random access response in a two-step random access procedure; wherein the first random access response at least contains a C-RNTI and contention resolution information allocated for the terminal equipment,
the first random access response reception time window is further used by the terminal equipment in monitoring a physical downlink control channel (PDCCH) scheduling a second random access response transmitted by the network device;
wherein the second random access response at least contains a TC-RNTI allocated for the terminal equipment and an uplink resource grant used for transmitting the Msg3 of a four-step random access by the terminal equipment, and
when the terminal equipment receives the first random access response or the second random access response in the first random access response reception time window, the terminal equipment stops monitoring:
the physical downlink control channel (PDCCH) scheduling the first random access response, and
the physical downlink control channel (PDCCH) scheduling the second random access response.

11. A communication system, comprising a network device and a terminal equipment;
the terminal equipment comprising:
a first transmitter configured to transmit a first message (MsgA) of a two-step random access procedure to a network device; wherein the first message (MsgA) comprises a preamble and physical uplink shared channel (PUSCH) data, and
a first monitor configured to monitor in a first random access response reception time window, a physical downlink control channel (PDCCH) scheduling a first random access response in a two-step random access procedure transmitted by the network device; wherein the first random access response at least contains a C-RNTI and contention resolution information allocated for the terminal equipment,
the first monitor further monitors in the first random access response reception time window, a physical downlink control channel (PDCCH) scheduling a second random access response transmitted by the network device; wherein the second random access response at least contains a TC-RNTI allocated for the terminal equipment and an uplink resource grant used for transmitting the Msg3 of the four-step random access by the terminal equipment, and
when the first monitor receives the first random access response or the second random access response in the first random access response reception time window, the first monitor stops monitoring a physical downlink control channel (PDCCH) of the first random access response and a physical downlink control channel (PDCCH) of the second random access response; and
the network device comprising:
a second transmitter configured to transmit indication information indicating a length of a first random access response reception time window to a terminal equipment,
the first random access response reception time window being used by the terminal equipment in monitoring a physical downlink control channel (PDCCH) scheduling a first random access response in a two-step random access procedure;
wherein the first random access response at least contains a C-RNTI and contention resolution information allocated for the terminal equipment,
the first random access response reception time window is further used by the terminal equipment in monitoring a physical downlink control channel (PDCCH) scheduling a second random access response transmitted by the network device; wherein the second random access response at least contains a TC-RNTI allocated for the terminal equipment and an uplink resource grant used for transmitting the Msg3 of the four-step random access by the terminal equipment, and
when the terminal equipment receives the first random access response or the second random access response in the first random access response reception time window, the terminal equipment stops monitoring:
the physical downlink control channel (PDCCH) scheduling the first random access response, and
the physical downlink control channel (PDCCH) scheduling the second random access response.

12. The device according to claim 7, wherein,
in a case where the monitor receives the first part or the second random access response in the first sub-time window, the monitor stops monitoring the physical downlink control channel (PDCCH) of the first part and the physical downlink control channel (PDCCH) of the second random access response.

* * * * *